United States Patent [19]

Kotulla

[11] Patent Number: 4,972,327

[45] Date of Patent: Nov. 20, 1990

[54] APPARATUS FOR MEASURING THE LEVEL OF FILLING OF A FUEL TANK

[75] Inventor: Günther Kotulla, Sulzbach, Fed. Rep. of Germany

[73] Assignee: VDO Adolf Schindling AG, Frankfurt am Main, Fed. Rep. of Germany

[21] Appl. No.: 327,321

[22] Filed: Mar. 21, 1989

[30] Foreign Application Priority Data

Jul. 6, 1988 [DE] Fed. Rep. of Germany ....... 3822846

[51] Int. Cl.$^5$ ............................................... G01F 23/24
[52] U.S. Cl. ................................. 364/509; 73/304 R; 364/571.07
[58] Field of Search ............. 73/304 R, 313; 364/509, 364/564; 340/618

[56] References Cited

U.S. PATENT DOCUMENTS 4,513,616  4/1985  Bezard ............................. 73/313 X
4,706,203  11/1987  Ramsdale et al. .................. 364/509
4,744,247  5/1988  Kaminski ....................... 73/304 R X
4,788,648  11/1988  Ferrette et al. ..................... 364/509
4,789,946  12/1988  Sinz ..................................... 364/509

Primary Examiner—Daniel M. Yasich
Attorney, Agent, or Firm—Martin A. Farber

[57] ABSTRACT

In an apparatus for measuring the level of filling of a fuel tank of a motor vehicle in which a transmitter gives off a transmitter signal which is dependent on the level of filling of an electronic signal-processing unit, there is provided in an electronic signal-processing unit, in addition to a program for the evaluation of the transmitter signal and the control of an indicating device, also a further program. Upon an initial placing in operation of the electronic signal-processing unit connected with the transmitter, the further program forms, at a known level of filling, preferably with empty tank, a correction value from the relationship between the transmitter signal and a stored desired value signal, and stores the correction value in a nonvolatile memory.

14 Claims, 4 Drawing Sheets

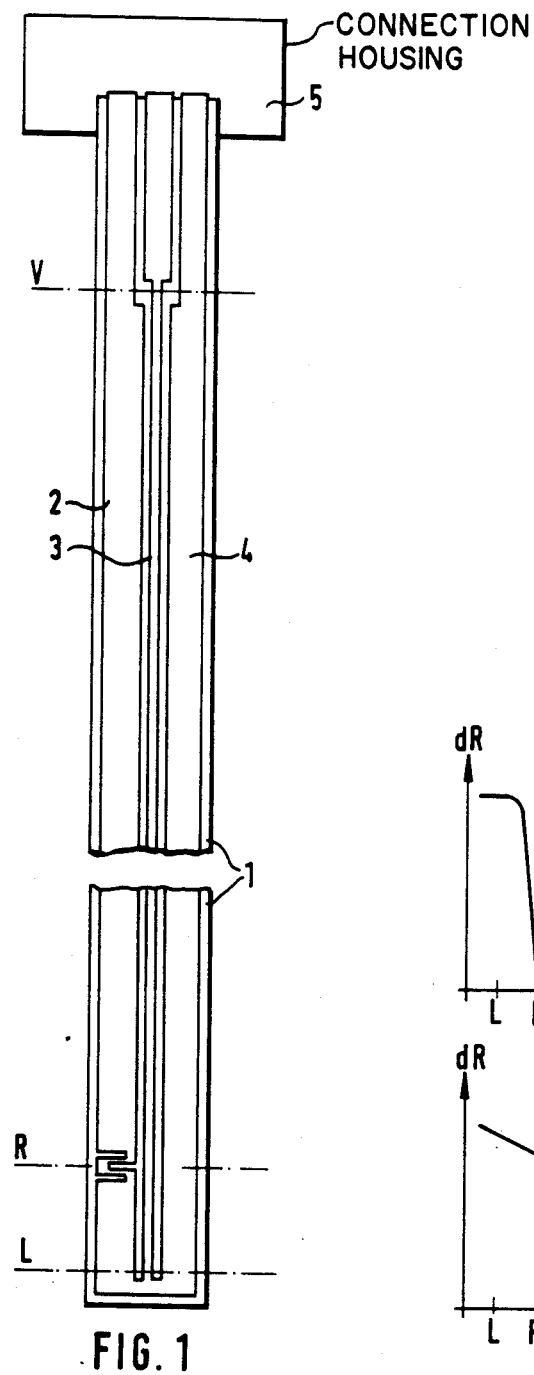
FIG. 1
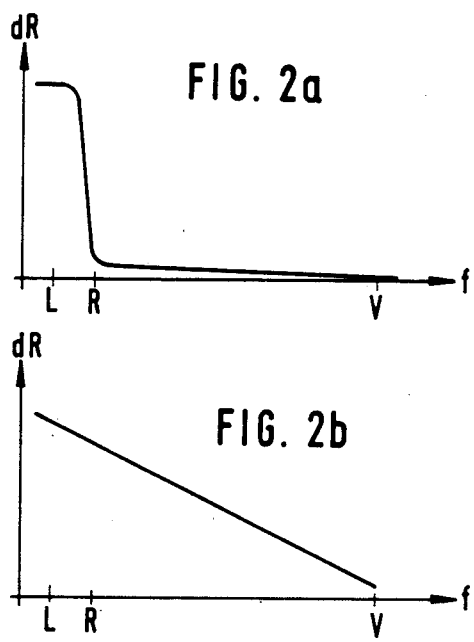
FIG. 2a
FIG. 2b

APPARATUS FOR MEASURING THE LEVEL OF FILLING OF A FUEL TANK

FIELD AND BACKGROUND OF THE INVENTION

The present invention relates to a device for measuring the level of filling of a fuel tank of a motor vehicle, in which a transmitter gives off a transmitter signal which is dependent on the level of filling to an electronic signal processing unit.

In known devices for measuring the level of filling of a fuel tank—hereinafter referred to as tank-measuring apparatus—before installation into the motor vehicle a compensation is necessary, in connection with which, in particular, tolerances of the transmitter and of an electronic circuit corresponding thereto are compensated for. This compensating process requires time as well as expensive measuring and testing means.

In the known tank-measuring apparatus, in the event of a defect it is furthermore necessary to replace it by a completely newly compensated tank-measuring apparatus, even if only the transmitter or the electronic system is defective.

In the known tank-measuring apparatus, furthermore, different embodiments are necessary for different models of motor vehicles. This is necessary, for instance, for the reason that the characteristic curve of the transmitter—i.e. the relationship between the transmitter signal and the level of filling—is dependent on the shape of the tank.

SUMMARY OF THE INVENTION

It is an object of the present invention to provide a tank-measuring apparatus which, insofar as possible, does not have the above-indicated disadvantages and furthermore permits substantial economic advantages in the manufacture and testing thereof and upon subsequent repair work.

According to the invention, there is provided in the electronic signal-processing unit (10), in addition to a program for the evaluation of the transmitter signal and for controlling an indicating device (23), also a program which, upon the initial placing in operation of the electronic signal processing unit connected with the transmitter, forms a correction value at a known level of filling, preferably with an empty tank, from the relationship between the transmitter signal and a stored desired value, and then stores said correction value in a nonvolatile memory.

The nonvolatile memory can preferably be formed of a nonvolatile RAM, but a battery-buffered write/read memory (RAM) or an electrically erasable programmable read-only memory (EEPROM) is also suitable.

The apparatus in accordance with the invention can be easily adapted to different models of motor vehicles and types of transmitters by replacement of the nonvolatile memory. The correction values can, in this connection, in addition to the table, be entered in the nonvolatile memory or be stored by modification of the table.

A further feature of the invention provides that a first compensation is carried out at least one predetermined level of filling, that correction values are thereby determined and written, and that after the first compensation there is written into the nonvolatile memory (12) information which means that the first compensation has been effected. By these measures the labor-intensive compensation after the installation of the tank-measuring apparatus is dispensed with.

Another feature permits compensation during operation in the manner that a further transmitter, constructed as a conductive path (2), is provided which gives off a binary transmitter signal which changes its level upon a given condition of filling, and that the binary transmitter signal is used, together with the transmitter signal, for the forming of the correction values, if a first compensation has been previously effected.

Another feature in an apparatus for measuring the level of filling of a fuel tank of a motor vehicle, in which a transmitter gives off a transmitter signal dependent on the level of filling to an electronic signal-processing unit, is that a nonvolatile memory (NV/RAM) (12) is provided, in which there can be placed a table which represents the relationship between the filling of the tank and the transmitter signal.

Still another feature is that in the nonvolatile memory (12) correction values are written which, in the case of at least one known level of filling, are derived from the transmitter signal.

Also, the correction values can be written-in addition to the table.

By another feature of the invention, correction values can be written-in by modification of the table.

Still further according to the invention, in the table, the relationship between an output signal which is given by the electronic signal-processing circuit (10, 11) to an indicating device (23) and the values indicated is taken into account.

Yet further, the first compensation is carried out with the tank empty.

Another aspect of the invention is that the carrying out of the first compensation can be indicated by an optical or acoustic signal, preferably by the lighting up of a spare display light (24).

Also by the invention, a current being fed to the transmitter, constructed as a conductive path (3), the value of the current is determined by at least one compensation process and is stored in the nonvolatile memory (12).

Still further, additional information can be stored in the non-volatile memory (12).

Another feature of the invention is that upon the disconnecting of the battery voltage, the last-indicated valid value is stored in the nonvolatile memory (12) and then read out and displayed after reconnection.

Also, the invention provides that in the electronic signal-processing unit there are provided a plurality of optionally activatable programs and program modules, and that information as to what programs or program modules are activated at the time is stored in the nonvolatile memory.

Still further according to the invention, a program which gives off error messages in the case of defects is provided in the electronic signal-processing unit, and error messages which are possibly given off are stored in the nonvolatile memory.

BRIEF DESCRIPTION OF THE DRAWINGS

With the above and other objects and advantages in view, the present invention will become more clearly understood in connection with the detailed description of preferred embodiments when considered with the accompanying drawings, of which:

FIG. 1 is a diagrammatic showing of a transmitter suitable for the apparatus of the invention; FIG. 2 comprises FIGS. 2a and 2b which show characteristic curves of the transmitter shown in FIG. 1.

DETAILED DESCRIPTION OF THE PREFERRED EMBODIMENT

Figure 3:
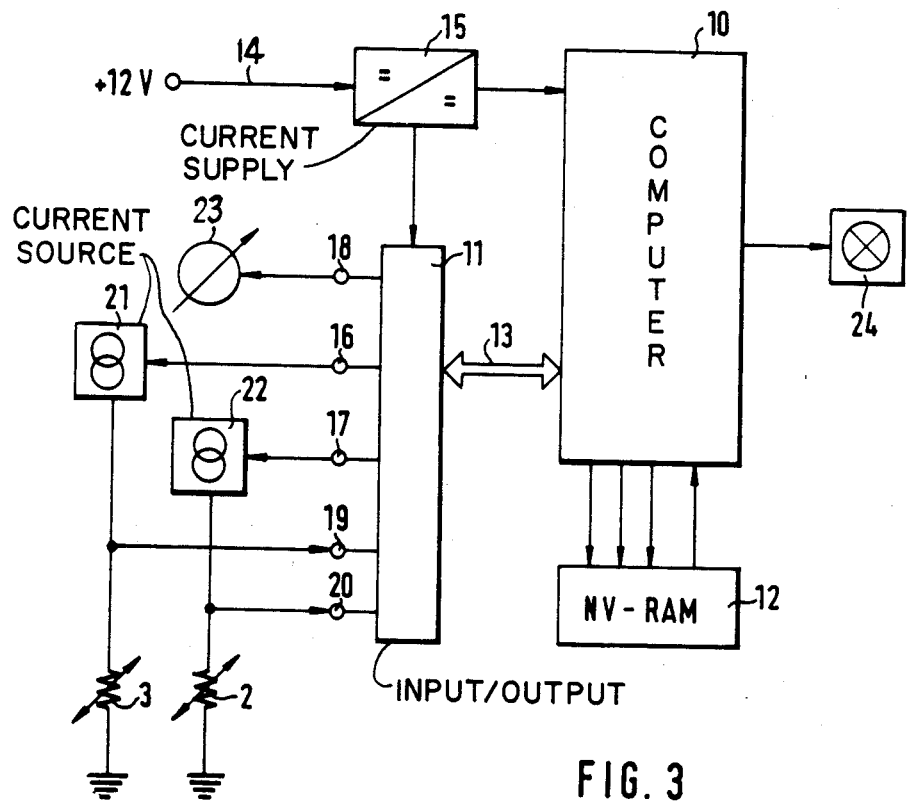
FIG. 3 is a block diagram of one embodiment.

Identical parts in the figures have been provided with the same reference numerals.

In the case of the transmitter shown in FIG. 1, three electrically-conductive paths 2, 3, 4 are applied on a foil 1. The foil extends over the vertical length of a fuel tank (not shown) and is held in guide parts which have also not been shown. At its upper end, the foil, together with the conductors, extends out of the fuel tank, is bent off approximately at right angles and is introduced into a connection housing 5.

The central conductive path 3 is developed as analog transmitter or probe, for which purpose it has a uniform cross section over the entire filling range to be measured (from L=empty to V=full). Above the filling-level range, the conductive path is wider, as a result of which less heating results due to the lower current density, so that the the conductive path is wider, as a result of which less heating results due to the lower current density, so that the measurement result, insofar as possible, is not degraded by changes in the resistance of this part.

Over by far the greatest part of its length, the conductive path 2 has a large cross section, so that here also no disturbing heating takes place. Only at the boundary to the reserve region R is the cross section substantially less. Furthermore, so that the resistance and/or change of resistance is concentrated on this filling-level value, the conductive path 2 serves a probe and is developed in meander shape within this region. In this case, it may be mentioned that, in the embodiment described below, a subsequent compensation is effected at the filling level R. However, it is also within the scope of the invention to effect subsequent compensations at several filling-level values during operation. The conductive path 4 serves as common return line for the conductive paths 2 and 3, which are developed as transmitter.

For measuring the level of filling the conductive path 3—hereinafter referred to also as "analog transmitter"—is acted on briefly by a constant current. The increase in voltage which results for the duration of the flow of current constitutes a measure of the increase in resistance and thus of the portion of the conductive path 3 which is not covered by liquid. The conductive path 2—hereinafter also referred to as "digital transmitter" or "binary transmitter"—is acted on briefly by a constant current, a substantial increase in resistance due to the greater resistance in the region of R resulting only if this region is not cooled and therefore if the level of filling is below R. As will be explained later in connection with FIG. 6, this measurement is used for subsequent adjustment during the normal course of the measurement.

FIG. 2b shows a characteristic curve of the analog transmitter 3, while FIG. 2a shows a characteristic curve of the digital transmitter 2. While in the case of the analog transmitter 3, the change in resistance dR proceeds approximately linearly with the level of filling f. In the case of the digital transmitter, the change in resistance dR takes place suddenly at the level of filling R.

The embodiment in accordance with FIG. 3 comprises a microcomputer 10, an input/output unit 11 and a nonvolatile memory 12. The microcomputer 10, which has been shown merely diagrammatically, contains, in known manner, a processor, a program memory and a work memory (not shown), as well as a bus system 13 which serves for the connecting of these units and also tends to data transmission between the microcomputer 10 and the input/output unit 11. The processor, being an electronic signal processing unit, is provided with a plurality of optionally activatable programs and program modules. The processing unit is operative with a program which gives off an error message in the case of defects, the error messages which are given off being stored in the nonvolatile memory 12. Battery voltage is fed via the connection 14 to a current supply unit 15 which provides the stabilized voltage necessary for the operation of the microcomputer and furthermore contains known protective circuits.

The input/output unit 11 has outputs 16, 17, 18 and inputs 19, 20 for analog signals. Therefore, digital-/analog converter, analog/digital converter and multiplexer are provided in known manner in the input/output unit 11.

In each case, a controllable current source 21, 22 is connected to the outputs 16, 17. They serve in each case to produce a current through the transmitters 2, 3. The voltage on the transmitters, which at constant current represents a measure of the resistance of the transmitters, is fed to the inputs 19, 20 of the input/output unit.

An indicating instrument 23 for the level of filling is connected to the output 18 of the input/output unit 11. Furthermore, a warning lamp 24 is connected to an output of the microcomputer 10.

As soon as it is known after the manufacture of an apparatus in accordance with the invention for what motor vehicle the apparatus is intended, and which of various transmitters is necessary for this, the apparatus is programmed accordingly. This can be done by the installation of a nonvolatile memory 12 provided with the necessary data, or possibly also by programming the apparatus if the nonvolatile memory is already installed. These data consist essentially of a table in which the level of filling to be indicated is contained as a function of the output voltage of the transmitter, in the form of a sufficiently large number of supporting values. In this connection, on the one hand, the behavior of the specific type of transmitter and the shape of the fuel tank are taken into consideration. The characteristic curve of the indicating instrument 23 can furthermore also be covered by the table.

A special correction value adapted to the individual transmitter is initially not yet stored. It is determined upon the initial placing in operation of the fuel measurement device in assembled state and stored in the nonvolatile memory 12. Depending on the embodiment, this correction value can be stored as correction value in addition to the table, and be taken into consideration upon a running of the normal measurement program. However, table values which have been corrected by the first compensation can also be stored. A further possibility of compensation consists of compensating the measurement current by the transmitter in such a manner that, with due consideration of the table values, the corrected indication is given. The value of this current can in this case be stored as correction value in the nonvolatile memory 12.

Figure 4:
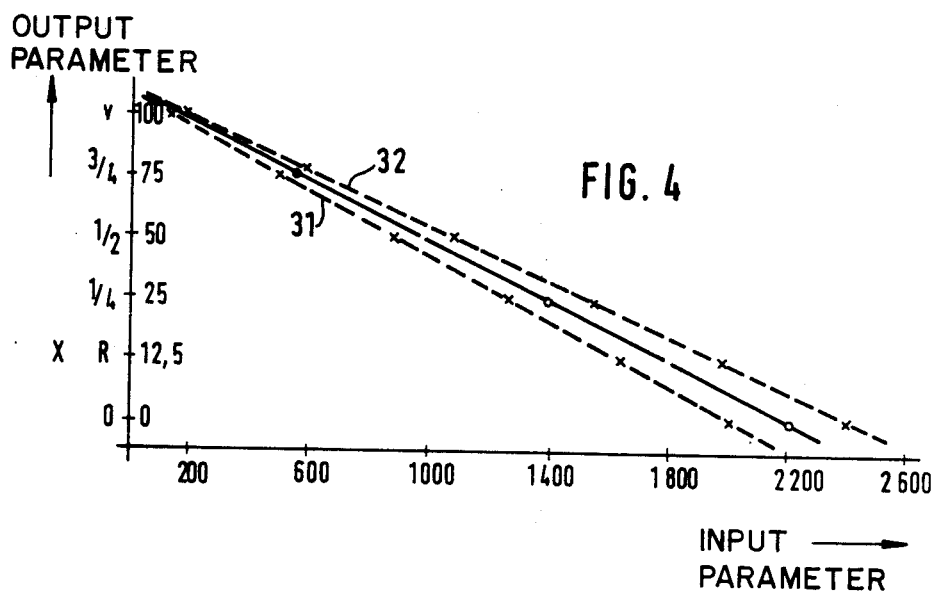
FIG. 4 is a more detailed showing of the characteristic curve of the transmitter.

The graph of FIG. 4 shows the dependence of the indication (output parameter) on the transmitter signal (input parameter), the input parameters being indicated in numerical values as they are advisedly stored in the nonvolatile memory. The solid line is stored in the nonvolatile memory in the new condition of the apparatus and represents the course of any desired sensor.

For a first compensation—hereinafter referred to as "initial compensation"—the fuel measurement apparatus is placed in operation with the tank empty. In this case an "empty" indication is obtained if the transmitter signal corresponds to the value 2200. In the case of a transmitter which, due, for instance, to manufacturing tolerances, has a course in accordance with characteristic curve 31, the transmitter signal however corresponds only to the actual value 2000. By division by the desired value 2200, the correction factor FK is obtained and then stored. The characteristic curve 32 represents a different course of another transmitter, in the case of which the correction factor is a different FK=2400/2200. Upon the subsequent measurement operation, the table values are then multiplied in the microcomputer by FK. After an initial compensation with a transmitter having the characteristic curve 31, the table values are therefore multiplied by FK=2400/2200, whereby table values adapted to the transmitter are produced.

Figure 5:
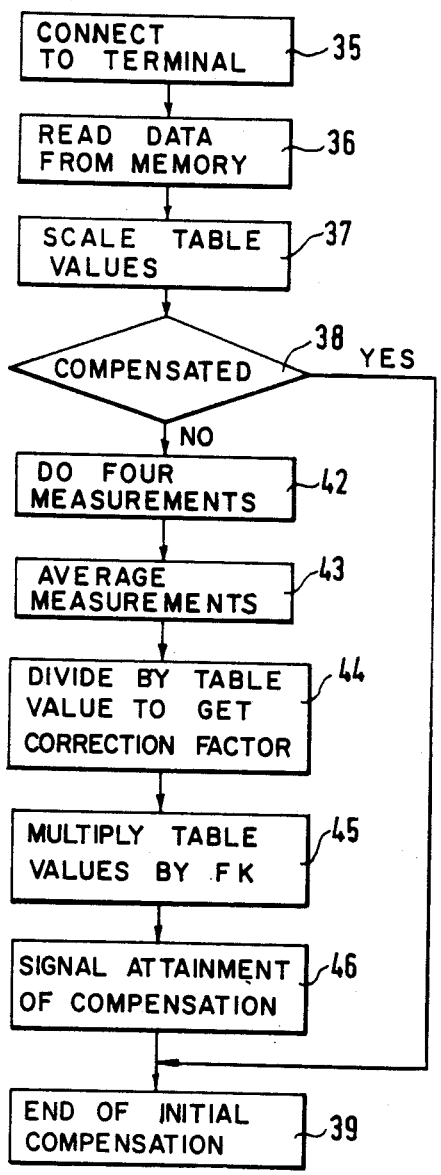
FIG. 5 is a flowchart of a program for the first compensation.

For a further explanation of the initial compensation, reference is had to the flowchart shown in FIG. 5. Upon a connecting of the apparatus to terminal 30 of a motor vehicle employing the apparatus, the start of the program takes place at block 35. In the program part 36 the data are read out from the nonvolatile memory and taken over into the work memory of the microcomputer.

These data comprise the table values, the correction factor and the information as to whether an initial compensation has already been effected. Upon the first placing in operation the latter is FK=1. In the program part 37, the table values are multiplied by the correction factor and again stored in the work storage. At 38 the program branches off, depending on whether an initial compensation has been carried out. If so, the program is terminated at 39.

However, if an initial compensation has not yet been carried out then, with the tank empty, four measurements are carried out in the program part 42, the results of which are averaged at 43, whereupon the correction factor FK is determined at 44 by division by the "empty" table value and written into the nonvolatile memory. The table values present in the work memory are multiplied at 45 by the correction factor FK. In the program part 46, the information that an initial compensation has been carried out is stored in the nonvolatile memory.

Figure 6:
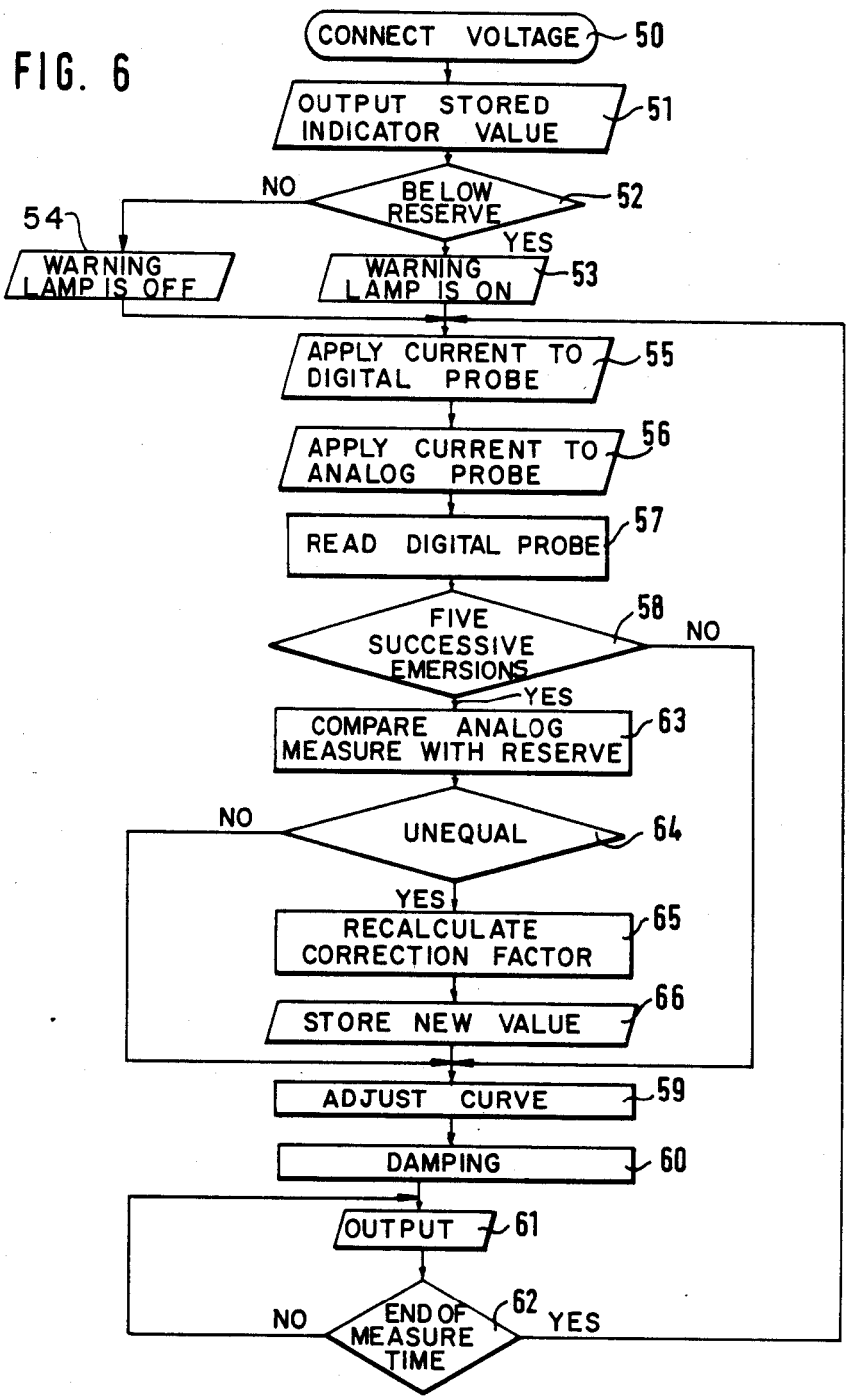
FIG. 6 is a flowchart of a program for the measurement operation.

The start of the program for the normal measurement course in accordance with FIG. 6 takes place at block 50 by the connecting of the voltage to the terminal 15 of a motor vehicle and, therefore, the program can start upon the turning-on of the ignition. Thereupon, in a program part 51, the stored indication value is outputted to the measurement instrument 23 (FIG. 3). At 52 the program branches depending on whether the indication is less than the reserve region. If so, the warning lamp is connected at 53. If the indication is greater than or equal to the reserve region, the warning lamp is turned off at 54.

In the program parts 55 and 56, the digital transmitter 2 (FIG. 1) and the analog transmitter 3 are passed through in succession by current, whereupon the corresponding resistances are measured and the measurement values are stored.

From the value of the digital transmitter it is recognized at 57 whether the level of filling is below or above the level predetermined by the digital transmitter. At 58, a branching takes place depending on whether the digital transmitter is above the liquid level at least five times in succession. If this is not the case, then adjustment of the characteristic curves takes place at 59, whereupon a program part 60 follows in order to dampen the variations in the measurement values caused by the sloshing fuel. At 61, the value to be indicated is outputted to the measurement instrument. As long as a measurement pause has not been completed, the program is so branched at 62 that the output 61 is repeated. The measurement pause permits a cooling of the transmitter between two successive measurements. When the measurement pause has come to an end, the program is repeated with the action of current on the transmitters, the measurement and the storing of the measurement values at 55 and 56.

If at the branching 58 the digital transmitter is above the liquid level at least five times in succession, then the measured value of the analog transmitter is compared at 63 with the table value provided for reserve. If the values are in agreement, then no additional compensation is necessary. After the branching 64 of the program, the program is continued in this case at 59. If the values to be compared are different, however, then the correction factor at 65 is recalculated and the table in the work memory adapted. The newly calculated correction value is stored in the nonvolatile memory in the program part 66.

I claim:

1. An apparatus for measuring the level of filling of a fuel tank of a motor vehicle, the apparatus comprising a transmitter which gives off a transmitter signal which is dependent on the level of filling;

an electronic signal processing unit which receives the transmitter signal; and wherein the processing unit comprises an indicator, a computer and a nonvolatile memory storing a desired value of filling level; and wherein there is a program employed by the processing unit to activate the computer to provide means for evaluating the transmitter signal and means for controlling the indicator;

there is a further program which, upon an initial placing in operation of the processing unit, activates the computer to provide means for forming a correction value at a known level of filling from a predetermined relationship between the transmitter signal and the stored desired value, said correction value being stored in the nonvolatile memory; and the nonvolatile memory is provided with a table of tabulated values which represents a relationship between the filling of the tank and the transmitter signal, said correction value being a multiplicative factor equal to the ratio of a tabulated value and a measured value.

2. An apparatus according to claim 1, wherein information, in addition to the desired filling level, is stored in the non-volatile memory.

3. An apparatus according to claim 1, wherein
the processing unit is operative with a program which gives off error messages in the case of defects, and said error messages which are given off are stored in the nonvolatile memory.

4. An apparatus for measuring the level of filling of a fuel tank of a motor vehicle, the apparatus comprising
a transmitter which gives off a transmitter signal which is dependent on the level of filling;
an electronic signal processing unit which receives the transmitter signal; and wherein
the processing unit comprises an indicator, a computer, and a nonvolatile memory storing a desired value of filling level; and wherein
there is a program employed by the processing unit to activate the computer to provide means for evaluating the transmitter signal and means for controlling the indicator;
there is a further program which, upon an initial placing in operation of the processing unit, activates the computer to provide means for forming a correction value at a known level of filling from a predetermined relationship between the transmitter signal and the stored desired value, said correction value being stored in the novolatile memory; and
the nonvolatile memory is provided with a table which represents a relationship between the filling of the tank and the transmitter signal; and
in the nonvolatile memory, correction values are written which, in the case of at least one known level of filling, are derived by said program from the transmitter signal.

5. An apparatus according to claim 4, wherein
the correction values are written in the table.

6. An apparatus according to claim 4, wherein
correction values are written into the memory by modification of the table.

7. An apparatus for measuring the level of filling of a fuel tank of a motor vehicle, the apparatus comprising
a transmitter which gives off a transmitter signal which is dependent on the level of filling;
an electronic signal processing unit which receives the transmitter signal; and wherein
the processing unit comprises an indicator, a computer, and a nonvolatile memory storing a desired value of filling level; and wherein
there is a program employed by the processing unit to activate the computer to provide means for evaluating the transmitter signal and means for controlling the indicator;
there is a further program which, upon an initial placing in operation of the processing unit, activates the computer to provide means for forming a correction value at a known level of filling from a predetermined relationship between the transmitter signal and the stored desired value, said correction value being stored in the nonvolatile memory; and
the nonvolatile memory is provided with a table which represents a relationship between the filling of the tank and the transmitter signal; and
said programs direct said processing unit to implement a first compensation at at least one predetermined level of filling, and to determine a correction value; and wherein
after the first compensation, there is written into the nonvolatile memory information indicating that the first compensation has been effected.

8. An apparatus according to claim 7, comprising
a further transmitter which gives off a binary signal designating a given condition of filing said binary signal having a first amplitude for tank filling levels below a reference filling level and a second amplitude for tank filling levels above the reference filling level, the first amplitude differing from the second amplitude; wherein
the binary signal is used, together with the first-mentioned transmitter signal, for forming the correction values upon attaining a first compensation.

9. An apparatus according to claim 7, wherein
the first compensation is implemented with the tank being empty.

10. An apparatus according to claim 7, wherein
the implementing of the first compensation can be indicated by an optical or acoustic signal, preferably by the lighting up of a display light.

11. An apparatus according to claim 7, wherein
a current is fed to the transmitter, the value of the current being determined by at least one compensation process and being stored in the nonvolatile memory.

12. An apparatus for measuring the level of filling of a fuel tank of a motor vehicle, the apparatus comprising
a transmitter which gives off a transmitter signal which is dependent on the level of filling;
an electronic signal processing unit which receives the transmitter signal; and wherein
the processing unit comprises an indicator, a computer, and a nonvolatile memory storing a desired value of filling level; and wherein
there is a program employed by the processing unit to activate the computer to provide means for evaluating the transmitter signal and means for controlling the indicator;
there is a further program which, upon an initial placing in operation of the processing unit, activates the computer to provide means for forming a correction value at a known level of filling from a predetermined relationship between the transmitter signal and the stored desired value, said correction value being stored in the nonvolatile memory; and
the nonvolatile memory is provided with a table which represents a relationship between the filling of the tank and the transmitter signal; and
in the table, there is stored a relationship between an output signal which is given by the electronic signal-processing circuit to an indicating device and the value indicated by the indicating device.

13. An apparatus for measuring the level of filling of a fuel tank of a motor vehicle, the apparatus comprising
a transmitter which gives off a transmitter signal which is dependent on the level of filling;
an electronic signal processing unit which receives the transmitter signal; and wherein
the processing unit comprises an indicator, a computer, and a nonvolatile memory storing a desired value of filling level; and wherein
there is a program employed by the processing unit to activate the computer to provide means for evaluating the transmitter signal and means for controlling the indicator;
there is a further program which, upon an initial placing in operation of the processing unit, activates the computer provide means for forming a correction value at a known level of filling from a predetermined relationship between the transmitter signal and the stored desired value, said correction value being stored in the nonvolatile memory; and upon the disconnecting of a battery voltage, a last valid value shown by the indicator is stored in the nonvolatile memory and then red out and displayed after reconnection of the battery voltage.

14. An apparatus for measuring the level of filling of a fuel tank of a motor vehicle, the apparatus comprising a transmitter which gives off a transmitter signal which is dependent on the level of filling;

an electronic signal processing unit which receives the transmitter signal; and wherein the processing unit comprises an indicator, a computer, and a nonvolatile memory storing a desired value of filling level; and wherein there is a program employed by the processing unit to activate the computer to provide means for evaluating the transmitter signal and means for controlling the indicator;

there is a further program which, upon an initial placing in operation of the processing unit, activates the computer to provide means for forming a correction value at a known level of filling from a predetermined relationship between the transmitter signal and the stored desired value, said correction value being stored in the nonvolatile memory;

in the electronic signal-processing unit there is provided a plurality of optionally activatable program and program modules, and wherein information as to said programs and said program module are activated at a time is stored in the nonvolatile memory.

* * * * *